United States Patent [19]

Munch

[11] 3,962,584
[45] June 8, 1976

[54] FILM-LOADING DEVICE

[75] Inventor: Joseph Munch, Deurne, Belgium

[73] Assignee: Compagnie Generale de Radiologie, Paris, France

[22] Filed: Oct. 7, 1974

[21] Appl. No.: 512,594

[30] Foreign Application Priority Data
Oct. 12, 1973 Belgium .................................. 53139

[52] U.S. Cl. ................................................ 250/468
[51] Int. Cl.² ........................................ G03B 41/16
[58] Field of Search ........... 250/468, 469, 470, 471, 250/475

[56] References Cited
UNITED STATES PATENTS
3,111,585   11/1963   Sano .................... 250/468

*Primary Examiner*—Craig E. Church
*Attorney, Agent, or Firm*—Edwin E. Greigg

[57] ABSTRACT

A film-loading device for use with X-ray apparatus includes a light-tight compartment with an opening in which a film container may be inserted. During the insertion, the film container actuates electrical switches which energize valves of pneumatic servo-cylinder assemblies. One of these servo assemblies closes the insertion slot with a light-tight slide and the other servo assembly returns an empty film container when a button is pushed manually.

3 Claims, 3 Drawing Figures

FILM-LOADING DEVICE

BACKGROUND OF THE INVENTION

The invention relates to a film-changing and loading device for use in X-ray apparatus. A closed box containing unexposed film is inserted and positioned in an X-ray apparatus where it is ultimately transferred to intensifier screens for exposure.

Until the present time, films have been packaged in special boxes and must be transferred in a darkroom to a cassette used by the film-loading mechanism.

OBJECT AND SUMMARY OF THE INVENTION

Accordingly, the principal object of the invention is to provide a film-changing and loading device which makes the transfer of film from the packing container to the cassette unnecessary so that the machine operator no longer needs to perform tasks in a darkroom.

This object is attained, according to an important characteristic of the invention, in that the film container is inserted in a light-tight compartment of a radiological examination table, whereupon the cover of the container is removed and the container box itself serves as the film cassette. A suitable mechanism then takes the film from the box, one sheet at a time, and transports it directly to the intensifier screens between which it is to be exposed during X-ray photography.

BRIEF DESCRIPTION OF THE DRAWING

An exemplary embodiment of the invention will now be described in detail with the aid of the drawing which is a simplified representation of the film-changing and loading mechanism according to the invention.

In the Drawing.

DESCRIPTION OF THE PREFERRED EMBODIMENT

Figure 2:
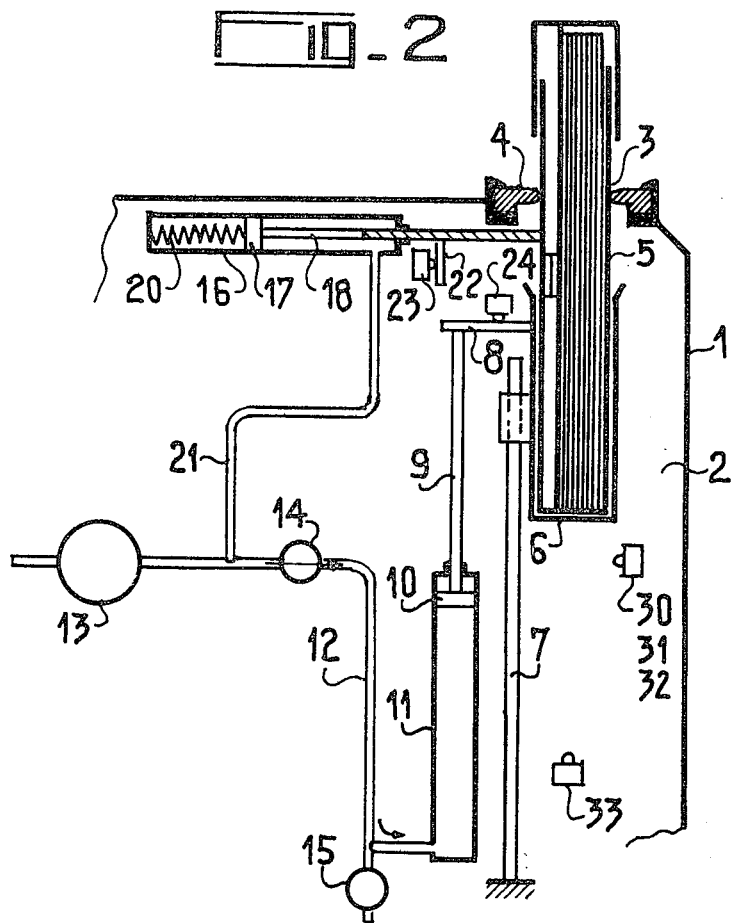
FIG. 2 is a view of of the same mechanism depicted in FIG. 1 during insertion of a full box of film.
Figure 3:
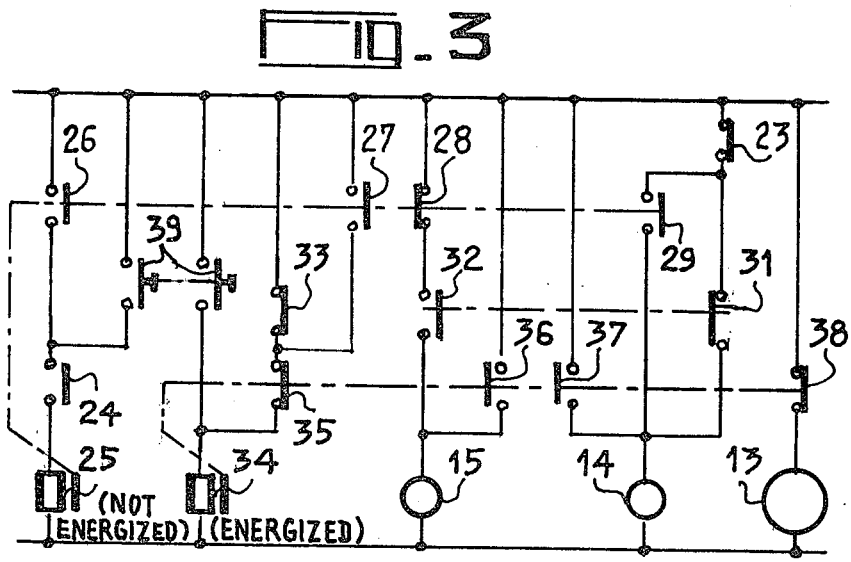
FIG. 3 is the schematic circuit diagram of the film-loading mechanism while it is in the position shown in FIG. 2.

The film-changing and loading mechanism includes a compartment 2 which is made completely light-tight by a shroud 1. The shroud 1 has an insertion slot 3 with an edge seal 4 which is made from an elastic material, such as rubber. The dimensions of the insertion slot 3 are such that they just admit a film container 5 of predetermined size against which the seal bears (FIG. 2). This film container 5, which may be for example of the type described in the Applicant's U.S. Pat. Application Ser. No. 506,531 filed Sept. 16, 1974, now abandoned, and consists of a parallelepipedic hollow box open at its top for containing a stack of bare film sheets and of a removable cover for ligh-tightly covering the open box top having a sidewall portion slideably surrounding the top end of the box. It serves as a cassette from which individual sheets of film are removed, for example, by means of a film extracting and handling mechanism of the type described in the Applicant's co-pending U.S. Pat. Application Ser. No. 512,870 filed Oct. 7, 1974, one by one for transfer to the intensifier screens of an X-ray apparatus. The light-tight compartment includes a receiver bracket 6 for holding the box 5. The receiver bracket moves vertically on guide rods 7. Connected to the receiver bracket 6 is a plate 8 to which the rod 9 of a piston 10 which is arranged to slide within a cylinder 11 is attached. The piston and cylinder serve to move the receiver bracket 6 on its guide rods 7. An air line 12 connects the lower end of the cylinder to an air pump 13. The line contains an electromagnetic valve 14 which can shut off the air supply to the cylinder 11 and an electromagnetic valve 15 which controls an ambient air opening. The film-changing and loading mechanism also includes a second cylinder 16 with a piston 17 attached to a rod 18. The piston rod 18 includes an extension in the form of a slide 19 which is adapted to close the insertion slot 3 completely and in a light-tight manner. A compression spring 20 urges the piston 17 to close the slide 19. At a point between the air pump 13 and the valve 14, a line 21 branches off from line 12 and communicates with the cylinder 16. A cam 22 on the slide 19 cooperates with a switch 23 for opening and closng the circuit of the electromagnetic valve 14. The plate 8 attached to the receiver bracket 6 cooperates with a breaker switch 24 in series with the windings of a relay 25. The contacts 26, 27 of this relay can take over the function of two starting contacts 39 operated by a push button, whereas the contacts 28, 29 respectively control the energizing circuits of the valves 15 and 14. The receiver bracket cooperates with a DP switch 30 that is provided with two contacts 31, 32. The contact 31 controls the energizing circuit of the electromagnetic valve 14, whereas the contact 32 controls the energizing circuit of the electromagnetic valve 15. A further switch 33 is engaged by the receiver bracket 6 when it is in its bottom position. This switch 33 controls the energizing circuit of a relay 34 whose contact 35 can assume the function of the switch 33.

The contacts 36, 37, 38 control the circuits of valve 15, valve 14, and of the air pump 13, respectively.

Figure 1:
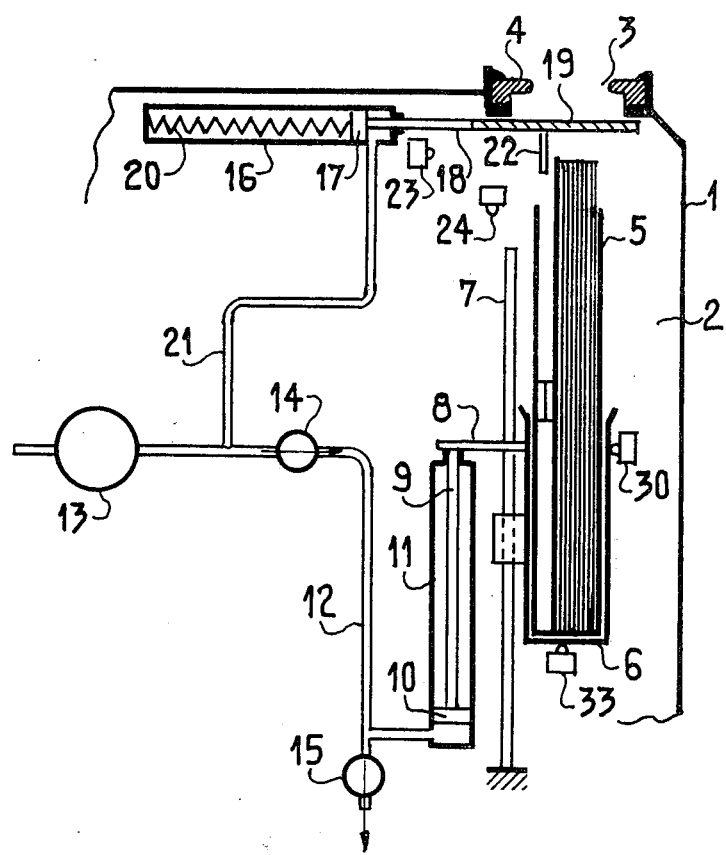
FIG. 1 is a schematic representation of the film-loading mechanism when it holds a box with unexposed film.

When an empty film box 5 is ready to be replaced by a full one in the film-loading mechanism described above, the apparatus is configured as illustrated in FIG. 1. This is the same configuration as when a full film box has been positioned in the mechanism. In order to insert a full box, the push button 39 is actuated. In the configuration illustrated in FIG. 1, the switch 24 is closed, hence the relays 25 and 34 are both energized by actuating the push button 39. The relay 25 closes contacts 26 and 27 which take over the function of the push button 39 which may now be released while both relays remain energized. The contact 28 of relay 25 is now open so that the switch 30 with its contacts 31, 32 is deprived of voltage. The energization of the relay 34 closes the contact 35 which assumes the function of the switch 33. The contact 36 of relay 34 is open and the circuit for the electromagnetic valve 15 is broken so that the valve closes and air can no longer escape from the line 12 to the atmosphere. At the same time, the contact 37 of relay 34 opens so that the valve 14 also closes. Air from the pump 13 can now flow through the line 21 to the cylinder 16. The contact 38 of relay 34 also closes so that the pump 13 starts and transports air to the cylinder 16. As a result, the piston 17 of the cylinder 16 moves the slide 19 and opens the insertion slot 3. When the slide has been pulled back, its cam 22 closes switch 23 so that the electromagnetic valve 14 is energized and opens, letting air flow into the cylinder 11. Piston 10 and the attached receiver bracket 6 holding the empty film box are thus moved upwardly until the box emerges from the insertion slot 3. Due to the displacement of the receiver bracket 6, the switch 33 is closed and the switch 30 is reversed, both without immediate effect. When the receiver bracket 6 has arrived in its upper position, the cam 8 depresses the switch 24 so that the energizing circuit of relay 25 is interrupted and the relay is unlatched. The empty film box 5 is now removed from the bracket 6 and replaced with a new box containing unexposed film (FIG. 2). The box 5 is then lightly pushed downwardly so that the receiver bracket 6 descends and cam 8 releases the switch 24. Further pressure on the box overcomes the counter pressure of the air from the pump 13 and thus the receiver bracket 6 descends farther and depresses switch 30. The contact 32 of this switch 30 closes the circuit for the electromagnetic valve 15 which opens, whereas the contact 31 of the switch 30 breaks the circuit for valve 14 which closes so that air from cylinder 11 escapes to the atmosphere. Since all resistance to the motion of the receiver bracket has now ceased, the box 5 and the receiver bracket 6 continue to descend due only to their own weight until the bracket 6 depresses switch 33 and breaks the circuit of relay 34, de-energizing it. As a consequence, the contact 37 of relay 34 closes and energizes valve 14 which opens. Contact 38 also opens, stopping the pump. Since the air in the cylinder 16 may now escape, spring 20 can easily move the piston 17 and the slide 19 which closes the insertion slot 3 so that light is excluded from the space 2.

During the descent of the box into the mechanism, the cover of the box is retained by the sealing edge 4 of the insertion slot 3 and provides a light-tight closure. After the descent of the box and after the slide 19 has been closed, the cover may be removed. The closure motion of the slide 19 releases switch 23, but this remains without immediate effect. The valve 15 is still open and the air from cylinder 16 can escape to the atmosphere. Thus, the entire mechanism is at rest and the film contained in the light-tight compartment 2 may be transferred, one sheet at a time, from the container to the intensifier screens of the X-ray apparatus by any suitable accessory apparatus.

The above description is of a preferred embodiment that may be modified without departing from the scope of the invention which is defined in the following claims.

What is claimed is:

1. In an X-ray apparatus for carrying out radiographic examinations including a housing having a compartment for light-tightly containing a supply of unexposed film; a film-loading device for introducing said film supply into said compartment in daylight, adapted to cooperate with a film container including a hollow parallelepipedic box for containing a plurality of uncovered film sheets stacked therein, having sidewalls and an open top end for introducing therein and extracting therefrom said film sheets and a removable cover for light-tightly covering said open top end having a skirt portion for slideably surrounding said box sidewalls adjacent said open top end; said film-loading device comprising:

A. a slot within said housing provided with an elastic edge seal for providing an opening allowing the introduction of said film container box into said compartment, said edge seal being in intimate contact with said box sidewalls during said introduction thereof and providing said opening with dimensions smaller than those of the cross section of said cover skirt portion surrounding said box sidewalls so that said cover remains on top of said edge seal outside said compartment for light-tightly covering said opening during the introduction of said film container box therein;

B. bracket means for receiving and holding said film container box by its bottom portion, within said compartment;

C. means for guidedly displacing said bracket means within said compartment, from one position wherein the top end of said film container box protrudes through said opening outside said compartment, to another position wherein said box is entirely inside said compartment and vice-versa;

D. retractable slide means displaceable within said compartment from one position leaving said opening free for the introduction of a full film container box into said compartment and for ejecting an empty one therefrom, to another position adjacent said opening for light-tightly obturating it when said bracket means has reached its other position;

E. means for displacing said slide means from one of its positions to its other one and vice-versa.

2. A film-loading device as defined in claim 1, wherein said means for displacing said bracket means include:

i. a first pneumatic cylinder with a piston having a first rod, located within said compartment, said first rod being associated with said bracket means;

ii. an electrical motor driven air pump connected to said first cylinder by a first air pipe;

iii. first electrically controlled valve means inserted in said first air pipe between said pump and said first cylinder;

iv. second electrically controlled valve means connected to said first air pipe between said first valve means and said first cylinder for opening them to ambient air;

v. first switching means actuated by said bracket means in an intermediate position thereof during its displacement towards its other position, for electrically controlling the closing of said first and the opening of said second valve means;

vi. second switching means actuated by said bracket means having reached its other position, for electrically controlling the closing of said second valve means and the stopping of said electrical motor driving said pump; and vii. third manually actuated switching means for electrically controlling the starting of said electrical motor when said second switching means is actuated.

3. A film-loading device as defined in claim 2, wherein said means for displacing said slide means include:

i. a second pneumatic cylinder with a piston having a second rod, located within said housing, said second rod being associated with said slide means;

ii. spring means disposed within said second cylinder for urging said piston and said associated slide means into said other position thereof adjacent said opening;

iii. a second air pipe connected to said first air pipe between said pump and said first valve means for connecting it to said second cylinder; and iv. fourth switching means actuated by said slide means in its one position where said opening is left free, for electrically controlling the opening of said first valve means so that said bracket means is moved from its other to its one position only after said slide means has been removed from said opening.

* * * * *